US011329805B2

(12) United States Patent
Zimmermann et al.

(10) Patent No.: US 11,329,805 B2
(45) Date of Patent: May 10, 2022

(54) FIRST VEHICLE-SIDE TERMINAL, METHOD FOR OPERATING THE FIRST TERMINAL, SECOND VEHICLE-SIDE TERMINAL AND METHOD FOR OPERATING THE SECOND VEHICLE-SIDE TERMINAL

(71) Applicant: Robert Bosch GmbH, Stuttgart (DE)

(72) Inventors: Christian Zimmermann, Stuttgart (DE); Norbert Bissmeyer, Hattingen (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 16/548,917

(22) Filed: Aug. 23, 2019

(65) Prior Publication Data

US 2020/0067703 A1    Feb. 27, 2020

(30) Foreign Application Priority Data

Aug. 24, 2018  (DE) ..................... 10 2018 214 354.4

(51) Int. Cl.
*H04L 9/08* (2006.01)
*H04W 4/46* (2018.01)
*H04L 9/32* (2006.01)

(52) U.S. Cl.
CPC .......... *H04L 9/0825* (2013.01); *H04L 9/0833* (2013.01); *H04L 9/3273* (2013.01); *H04W 4/46* (2018.02)

(58) Field of Classification Search
CPC ... H04L 9/0825; H04L 9/3273; H04L 9/0833; H04L 9/0822; H04L 9/0863;
(Continued)

(56) References Cited

U.S. PATENT DOCUMENTS 8,051,489 B1    11/2011  Montenegro
10,037,689 B2 *  7/2018  Taylor ................ G06K 7/10475
(Continued)

FOREIGN PATENT DOCUMENTS

EP         2661127 A1    11/2013
WO    2016123254 A1     8/2016

OTHER PUBLICATIONS

Hasrouny et al., Trust model for secure group leader-based communications in VANET, May 17, 2018, Wireless networks 25: 4639-4661 (Year: 2018).*
(Continued)

*Primary Examiner* — Saleh Najjar
*Assistant Examiner* — Khalid M Almaghayreh
(74) *Attorney, Agent, or Firm* — Michael Best & Friedrich LLP

(57) ABSTRACT

A method for operating a first vehicle-side terminal is provided, wherein the first vehicle-side terminal determines at least one symmetric group key that is assigned to the group of terminals, encrypts the at least one symmetric group key with a public asymmetric individual key that is assigned to a second vehicle-side terminal or with a symmetric pair key that is assigned to the second vehicle-side terminal, transmits the encrypted symmetric group key in the direction of the second vehicle-side terminal, receives an encrypted message from the second vehicle-side terminal, and decrypts the encrypted message depending on the symmetric group key.

12 Claims, 6 Drawing Sheets

(58) Field of Classification Search
CPC ............. H04L 9/0891; H04L 2463/062; H04L 63/0435; H04L 63/065; H04W 12/03; H04W 12/02; H04W 4/46
See application file for complete search history.

(56) References Cited

U.S. PATENT DOCUMENTS

| | | | | |
|---|---|---|---|---|
| 10,254,766 | B2* | 4/2019 | High | G05D 1/0295 |
| 10,259,456 | B2* | 4/2019 | Park | B60W 30/18163 |
| 10,429,854 | B2* | 10/2019 | Darms | G05D 1/0246 |
| 10,609,528 | B2* | 3/2020 | Doggart | H04W 4/08 |
| 10,757,485 | B2* | 8/2020 | Al-Stouhi | G07C 5/008 |
| 10,872,523 | B2* | 12/2020 | Maeda | G08G 1/0112 |
| 10,919,444 | B2* | 2/2021 | Switkes | G08G 1/22 |
| 10,940,861 | B2* | 3/2021 | Darms | G05D 1/0212 |
| 2005/0141706 | A1* | 6/2005 | Regli | H04L 63/06 380/44 |
| 2015/0127189 | A1* | 5/2015 | Mehr | G08G 1/22 701/1 |
| 2016/0218865 | A1* | 7/2016 | Patil | H04W 12/041 |
| 2016/0218866 | A1 | 7/2016 | Patil et al. | |
| 2017/0337813 | A1* | 11/2017 | Taylor | G08G 1/0965 |
| 2018/0076959 | A1 | 3/2018 | Komano et al. | |
| 2018/0091489 | A1 | 3/2018 | Biggs et al. | |
| 2020/0125117 | A1* | 4/2020 | Switkes | H04W 4/029 |
| 2020/0184827 | A1* | 6/2020 | Park | H04L 67/125 |
| 2020/0250983 | A1* | 8/2020 | Kim | G08G 1/096775 |
| 2020/0284883 | A1* | 9/2020 | Ferreira | G01S 7/484 |
| 2020/0410868 | A1* | 12/2020 | Bouillon | G05D 1/0293 |
| 2021/0012661 | A1* | 1/2021 | Yang | G08G 1/162 |

OTHER PUBLICATIONS

Hasrouny Hamssa et al., "Trust model for secure group leader-based communications in VANET", Wireless Networks, Nb. 25, Nr. 8, 17, pp. 4639-4661, May 2018, New York, USA.

Maxim Raya et al., "Securing vehicular ad hoc networks", JOurnal of Computer Security, Bd. 15, Nr. 1, Jan. 2007, pp. 39-68.

* cited by examiner

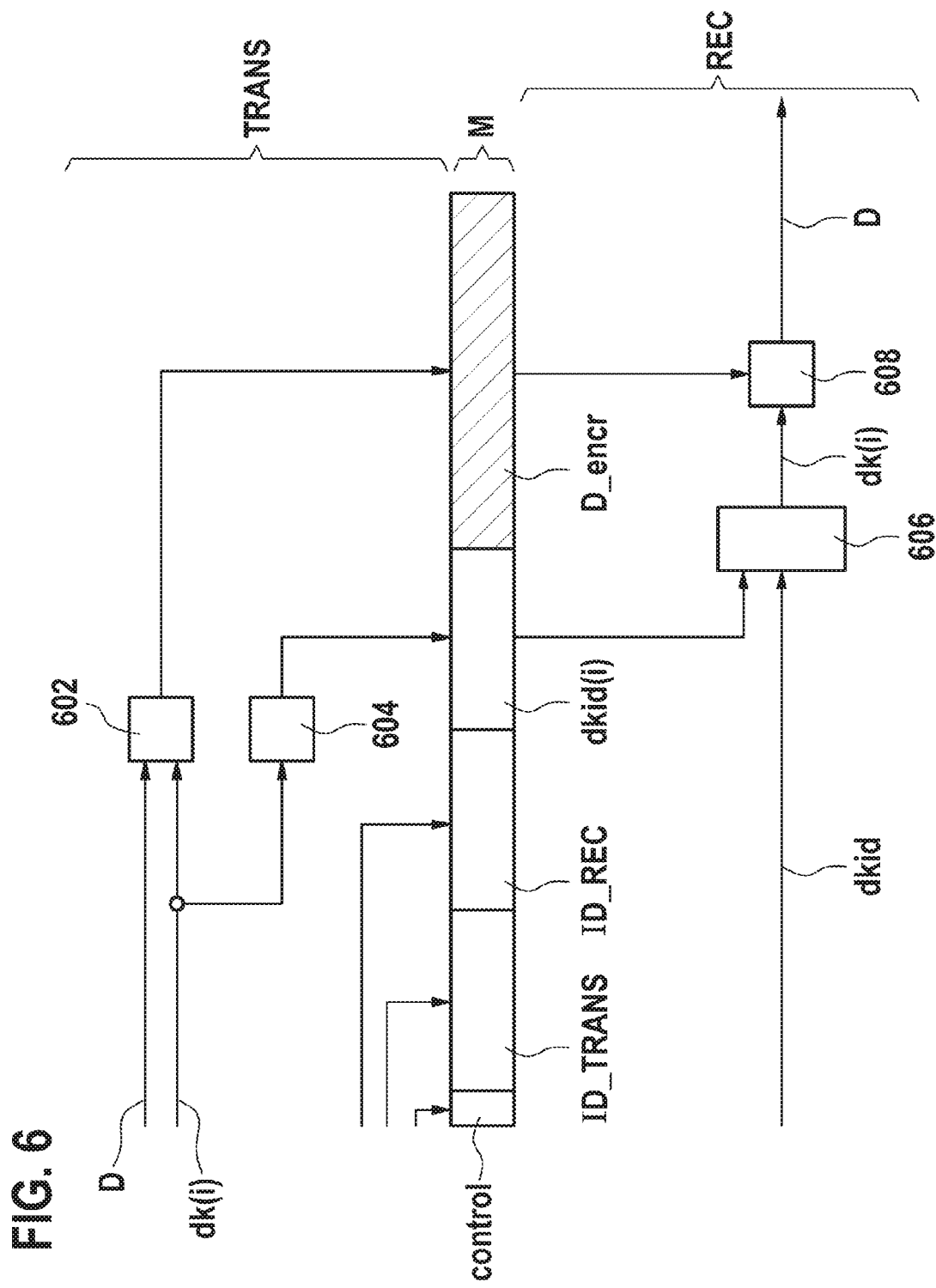

FIRST VEHICLE-SIDE TERMINAL, METHOD FOR OPERATING THE FIRST TERMINAL, SECOND VEHICLE-SIDE TERMINAL AND METHOD FOR OPERATING THE SECOND VEHICLE-SIDE TERMINAL

BACKGROUND OF THE INVENTION

The invention relates to a first vehicle-side terminal, to a method for operating the first terminal, to a second vehicle-side terminal and to a method for operating the second vehicle-side terminal.

SUMMARY OF THE INVENTION

The problems from the prior art are solved by a first vehicle-side terminal according to the invention, a method for operating the first terminal according to the invention, a second vehicle-side terminal according to the invention and a method for operating the second vehicle-side terminal according to the invention.

According to one aspect of this description, a first vehicle-side terminal of a group of terminals of a radio communication network is provided, wherein the first vehicle-side terminal comprises at least one processor, at least one memory containing computer program code, at least one communication module and at least one antenna, wherein the computer program code is configured such that it acts with the at least one processor, the at least one communication module and the at least one antenna such that the first vehicle-side terminal determines at least one symmetric group key that is assigned to the group of terminals, encrypts the at least one symmetric group key with a public asymmetric individual key that is assigned to a second vehicle-side terminal or with a symmetric pair key that is assigned to the first and to the second vehicle-side terminal, transmits the encrypted symmetric group key in the direction of the second vehicle-side terminal, receives an encrypted message from the second vehicle-side terminal, and decrypts the encrypted message depending on the determined symmetric group key.

The secure distribution and use of the symmetric group key using the public key or the symmetric pair key in vehicle communication entails several advantages. The symmetric group key is thereby advantageously distributed to each terminal of the group of terminals for the purpose of secure communication within the group. In contrast to asymmetric encryption methods, this results in advantages in terms of the computational burden and in terms of the resultant size of the encrypted data. The message is therefore able to be encrypted quickly and decrypted quickly, which reduces the latency between message generation on the side of the second vehicle-side terminal and the message processing on the side of the first vehicle-side terminal or other vehicle-side terminals belonging to the group.

By reducing the data size and reducing the computational burden, this results in the abovementioned reduced latencies for messages that are transmitted over the radio channel in a manner encrypted with the symmetric group key. In particular for vehicles driving in a convoy, what is known as a platoon, this means that safety distances between the vehicles are able to be reduced. This therefore results in the potential to save fuel or drive energy due to the improved usage of the slipstream of vehicles driving in front.

Furthermore, privacy protection of the communication between the vehicle-side terminals is improved by virtue of a regular change of the group key and of the pair key.

One advantageous example is distinguished in that the first vehicle-side terminal receives an encrypted admission request from the second vehicle-side terminal, decrypts the admission request depending on a private asymmetric key that is assigned to the first vehicle-side terminal, determines at least two symmetric group keys that are assigned to the group of terminals, determines the symmetric pair key, encrypts the at least two symmetric group keys and the determined symmetric pair key with the public asymmetric individual key that is assigned to the second terminal, and transmits the at least two encrypted symmetric group keys and the determined encrypted symmetric pair key in the direction of the second vehicle-side terminal.

Advantageously, a transition from an asymmetric encryption to the more latency-friendly symmetric encryption is performed already at the registration procedure in which the second vehicle-side terminal is incorporated into the group of terminals.

One advantageous example is distinguished in that the first vehicle-side terminal determines a change of the symmetric group key, selects a symmetric group key already distributed in the group as valid symmetric group key, determines a new symmetric group key, encrypts the new symmetric group key depending on the symmetric pair key that is assigned to the second vehicle-side terminal, and transmits the encrypted new symmetric group key in the direction of the second vehicle-side terminal.

Advantageously, this change scheme for the group key achieves a situation whereby the selection of the group key is able to be made immediately. This means that the determination and the transmission of the group key are decoupled from the selection of the group key as group key valid for the encryption.

One advantageous example is distinguished in that the first vehicle-side terminal receives a positive reception confirmation that confirms the reception of a new symmetric group key by the second vehicle-side terminal, determines a new symmetric pair key that is assigned to the second vehicle-side terminal depending on the reception of the positive reception confirmation, and selects the new symmetric pair key as valid symmetric pair key.

Advantageously, the determination, individually by the terminals, of the pair key avoids repeated transmission of the pair key over the radio channel. Furthermore, by virtue of waiting for the reception confirmation, the determination, individually by the terminals, of the new symmetric pair key that is assigned to the second terminal is synchronized.

One advantageous example is distinguished in that the first vehicle-side terminal receives a withdrawal request from a third terminal, determines a further new symmetric group key, encrypts the further new symmetric group key and a withdrawal indication depending on the symmetric pair key that is assigned to the second terminal, transmits the encrypted further new symmetric group key and the withdrawal indication in the direction of the second vehicle-side terminal, selects the further new symmetric group key as currently valid group key, determines a further new symmetric pair key that is assigned to the second vehicle-side terminal, and selects the further new symmetric pair key as valid symmetric pair key.

The withdrawal request of the third terminal triggers an immediate change of the symmetric group key and of the symmetric pair key, which increases the security against attacks for the terminals still remaining in the group.

One advantageous example is distinguished in that the first vehicle-side terminal receives the encrypted message and an encrypted signature from the second vehicle-side terminal, decrypts the encrypted message and the encrypted signature depending on the symmetric group key, and verifies the origin of the message from the second vehicle-side terminal depending on the signature and depending on a public certificate that is assigned to the second vehicle-side terminal.

Identity fraud by an attacker within the group is advantageously thereby able to be recognized. The first terminal, by virtue of checking the received signature, is able to identify such an attack within the group and ignore the message in question or initiate other countermeasures.

A further aspect of this description relates to a method in which the first vehicle-side terminal determines at least one symmetric group key that is assigned to the group of terminals, encrypts the at least one symmetric group key with a public asymmetric individual key that is assigned to a second vehicle-side terminal or with a symmetric pair key that is assigned to the second vehicle-side terminal, transmits the encrypted symmetric group key in the direction of the second vehicle-side terminal, receives an encrypted message from the second vehicle-side terminal, and decrypts the encrypted message depending on the symmetric group key.

According to a further aspect of this description, a second vehicle-side terminal of a group of terminals of a radio communication network is provided, wherein the second vehicle-side terminal comprises at least one processor, at least one memory containing computer program code, at least one communication module and at least one antenna, wherein the computer program code is configured such that it acts with the at least one processor, the at least one communication module and the at least one antenna such that the second vehicle-side terminal receives at least one encrypted symmetric group key that is assigned to the group of terminals from a first vehicle-side terminal, decrypts the at least one encrypted symmetric group key with a private asymmetric individual key that is assigned to the second vehicle-side terminal or with a symmetric pair key that is assigned to the first and to the second vehicle-side terminal, encrypts a message depending on the received decrypted symmetric group key, and transmits the encrypted message in the direction of the first vehicle-side terminal.

The secure distribution and use of the symmetric group key using the public key or the symmetric pair key in vehicle communication entails several advantages. The symmetric group key is thereby advantageously distributed to each terminal of the group of terminals for the purpose of secure communication within the group. In contrast to asymmetric encryption methods, this results in advantages in terms of the computational burden and in terms of the resultant size of the encrypted data. The message is therefore able to be encrypted quickly and decrypted quickly, which reduces the latency between message generation on the side of the second vehicle-side terminal and the message processing on the side of the first vehicle-side terminal or other vehicle-side terminals belonging to the group.

By reducing the data size and reducing the computational burden, this results in the abovementioned reduced latencies for messages that are transmitted over the radio channel in a manner encrypted with the symmetric group key. In particular for vehicles driving in a convoy, what is known as a platoon, this means that safety distances between the vehicles are able to be reduced. This therefore results in the potential to save fuel or drive energy due to the improved usage of the slipstream of vehicles driving in front.

One advantageous example is distinguished in that the second vehicle-side terminal encrypts an admission request depending on a public asymmetric key that is assigned to the first vehicle-side terminal, transmits the encrypted admission request in the direction of the first vehicle-side terminal, receives at least two encrypted symmetric group keys and an encrypted symmetric pair key, and decrypts the at least two encrypted symmetric group keys and the encrypted symmetric pair key depending on a private asymmetric individual key that is assigned to the second terminal.

One advantageous example is distinguished in that the second vehicle-side terminal determines a change of the symmetric group key, selects an already received symmetric group key as valid symmetric group key, receives a new encrypted symmetric group key from the first vehicle-side terminal, and decrypts the new encrypted symmetric group key depending on the symmetric pair key that is assigned to the second vehicle-side terminal.

Advantageously, this change scheme for the group key achieves a situation whereby the selection of the group key is able to be made immediately. This means that the determination and the transmission of the group key are decoupled from the selection thereof as valid group key for the encryption.

One advantageous example is distinguished in that the second vehicle-side terminal receives a new encrypted symmetric group key, decrypts the encrypted symmetric group key depending on the currently valid symmetric pair key, transmits a positive reception confirmation that confirms the reception of the new symmetric group key by the second vehicle-side terminal, and selects the new symmetric pair key, which is in particular determined depending on the valid pair key, as valid symmetric pair key.

Advantageously, the determination, individually by the terminals, of the pair key avoids repeated transmission of the pair key over the radio channel. Furthermore, by virtue of waiting for the reception confirmation, the determination, individually by the terminals, of the new symmetric pair key that is assigned to the second terminal is synchronized.

One advantageous example is distinguished in that the second vehicle-side terminal receives an encrypted further new symmetric group key and an encrypted withdrawal indication, decrypts the further new symmetric group key and the withdrawal indication depending on the symmetric pair key that is assigned to the second terminal, selects the further new symmetric group key as currently valid group key depending on the withdrawal indication, determines a further new symmetric pair key that is assigned to the second vehicle-side terminal, and selects the further new symmetric pair key as valid symmetric pair key depending on the withdrawal indication.

The withdrawal indication thus triggers an immediate change of the symmetric group key to the received group key and an immediate renewal of the symmetric pair key, which increases the security against attacks for the terminals still remaining in the group.

One advantageous example is distinguished in that the second vehicle-side terminal determines a signature depending on the message and depending on the private asymmetric key that is assigned to the second vehicle-side terminal, encrypts the message and the signature depending on the valid symmetric group key, and transmits the encrypted message and the encrypted signature in the direction of the first vehicle-side terminal.

Identity fraud by an attacker within the group is advantageously thereby able to be recognized. The second terminal, by virtue of checking the received signature, is able to identify such an attack within the group and ignore the message in question or initiate other countermeasures.

According to a further aspect of this description, a method for operating a second vehicle-side terminal is provided, wherein the second vehicle-side terminal receives at least one encrypted symmetric group key that is assigned to the group of terminals from a first vehicle-side terminal, decrypts the at least one encrypted symmetric group key with a private asymmetric individual key that is assigned to the second vehicle-side terminal or with a symmetric pair key that is assigned to the first and to the second vehicle-side terminal, encrypts a message depending on the received decrypted symmetric group key, and transmits the encrypted message in the direction of the first vehicle-side terminal.

BRIEF DESCRIPTION OF THE DRAWINGS

In the drawing:

FIG. 6 shows a schematic block diagram for determining and processing a message.

DETAILED DESCRIPTION

Figure 1:
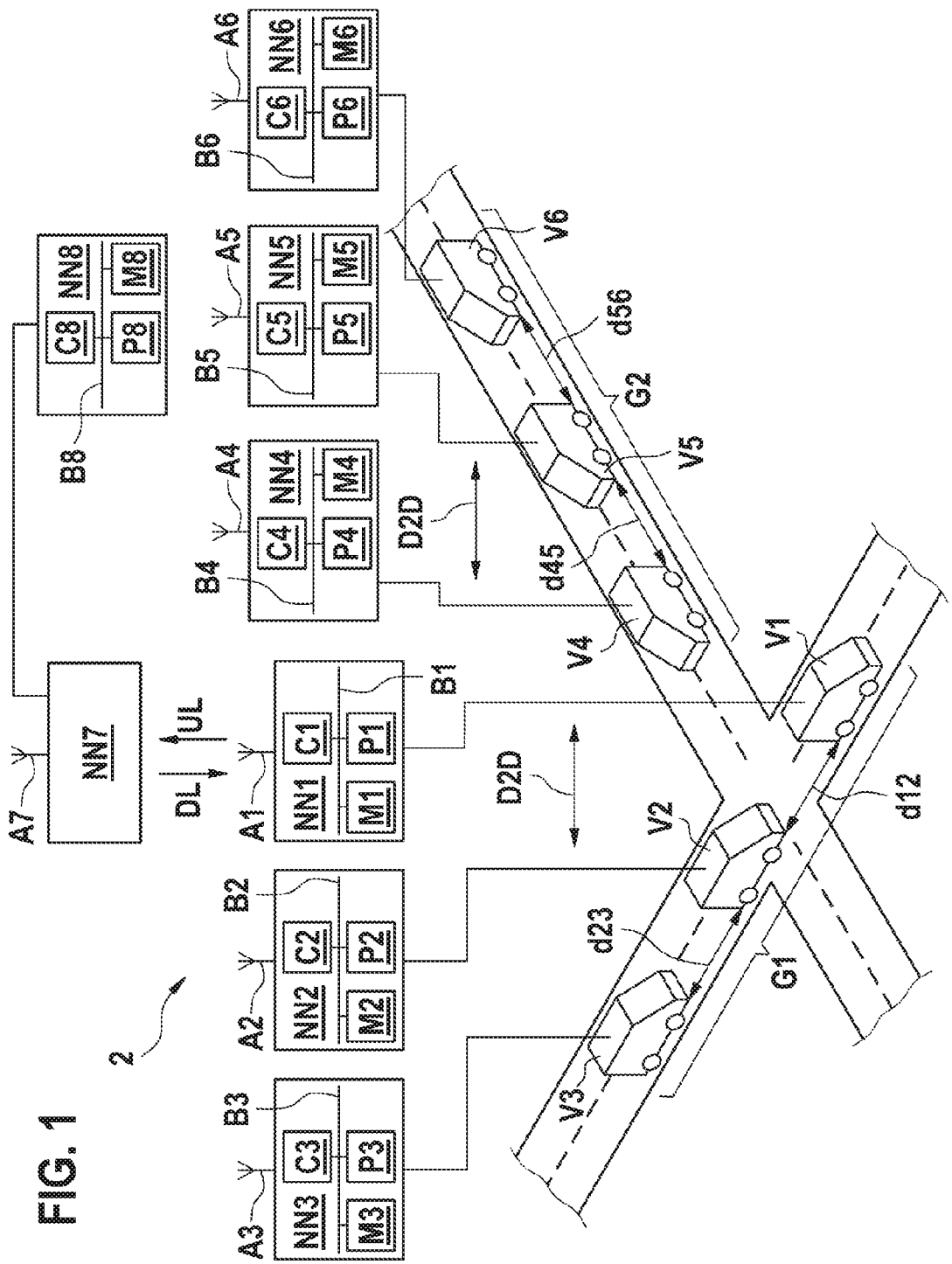
FIG. 1 schematically shows a radio communication network.

FIG. 1 schematically shows a radio communication network 2. A first group G1 of vehicles V1, V2 and V3 communicates by way of a respective vehicle-side terminal NN1 to NN3 via at least one for example exclusively assigned D2D radio resource D1 (D2D: device to device) and coordinates for example the vehicle distance d12, d23 and braking and acceleration maneuvers of the respective vehicle V1 to V3. A second group G2 of vehicles V4, V5 and V6 communicates by way of a respective vehicle-side terminal NN4 to NN6 via at least one for example exclusively assigned D2D radio resource D2 and coordinates for example the vehicle distance d45, d56 and braking and acceleration maneuvers of the respective vehicle V4 to V6. The at least one D2D radio resource D1, D2 is for example characterized by a periodicity of assigned regions in a time and frequency grid. The communication of the groups G1 and G2 is not mutually influenced by the failure of the D2D radio resources D1 and D2, although the radio ranges of the two groups G1 and G2 overlap, that is to say that the terminal NN6 could receive messages from the terminal NN3, for example.

In addition to direct communication with one another, the terminals NN1 to NN6 support the capability of transmitting messages in the direction of an infrastructure unit NN7, such as for example a remote radio head, RRH, or a base station, eNodeB, within a cell-based network via uplink radio resources UL, and of receiving messages from the infrastructure unit NN7 via downlink radio resources DL. The uplink and downlink resources UL, DL are assigned, that is to say scheduled, centrally, for example by the infrastructure unit NN7. The infrastructure unit NN7 comprises an antenna A7. The infrastructure unit NN7 is connected to the network unit NN8 in order to communicate. The D2D radio resources D1, D2 are also referred to as sidelink resources. The vehicle-side terminals NN1 to NN6 use the D2D radio resources D1, D2 that are not allocated, that is to say scheduled, in a cell-based manner (D2D: device to device).

If LTE-V2X D2D is to be used, there is also the possibility of scheduling the sidelink by way of a central unit via a downlink control channel.

The vehicle-side terminals NN1 to NN6 each comprise a processor P1-P6, a communication module C1-C6, an antenna A1-A6 and a memory M1-M6. The memory M1-M6 is in each case provided with a computer program code that is configured such that it executes the steps described in this specification with the at least one processor P1-P6, the at least one communication module C1-C6 and the at least one antenna A1-A6. In one example, the communication modules C1-C6 have a security module executed in hardware for the secure storage of cryptographic data.

The network unit NN8 comprises a processor P8, a communication module C8, and a memory M8. The memory M8 is provided with a computer program code.

Figure 2:
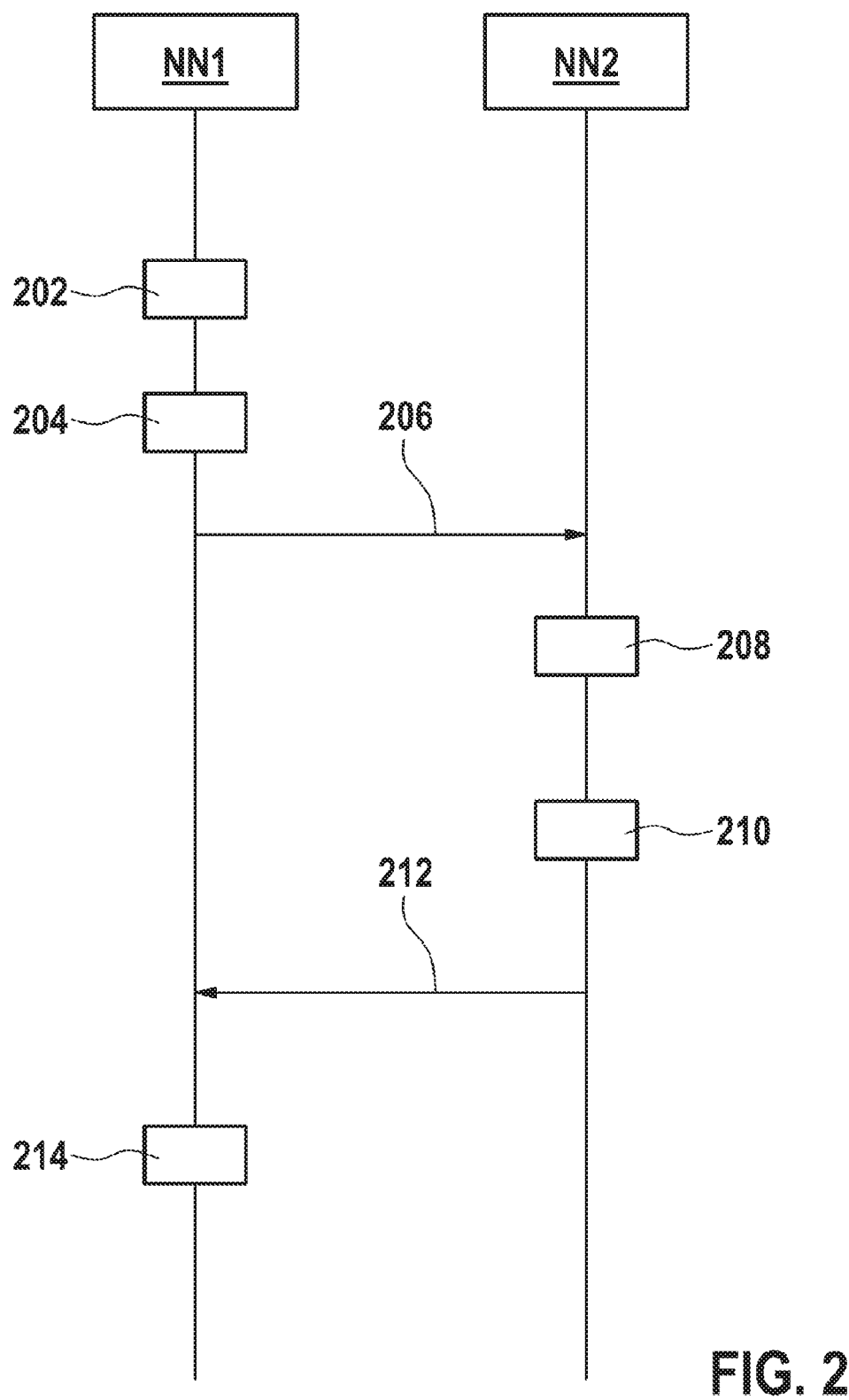
FIGS. 2 to 5 each show a schematic flowchart.

FIG. 2 shows a schematic flowchart for operating the respective terminals NN1, NN2. In a step 202, at least one symmetric group key that is assigned to the group of terminals is determined. In a step 204, the at least one symmetric group key is encrypted with a public asymmetric individual key that is assigned to the second vehicle-side terminal NN2 or with a symmetric pair key that is assigned to the first and to the second vehicle-side terminal NN1, NN2. In a step 206, the encrypted symmetric group key is transmitted to the second vehicle-side terminal NN2.

In a step 208, the second terminal NN2 decrypts the at least one encrypted symmetric group key with a private asymmetric individual key that is assigned to the second vehicle-side terminal or with a symmetric pair key that is assigned to the first and to the second vehicle-side terminal NN1, NN2. The second terminal NN2 determines a message to be transmitted to the first terminal NN1 or to the group of terminals. In a step 210, the second terminal NN2 encrypts the message depending on the received and decrypted symmetric group key. In a step 212, the encrypted message is transmitted from the terminal NN2 to the terminal NN1. In a step 214, the first terminal NN1 decrypts the received and encrypted message.

Figure 3:
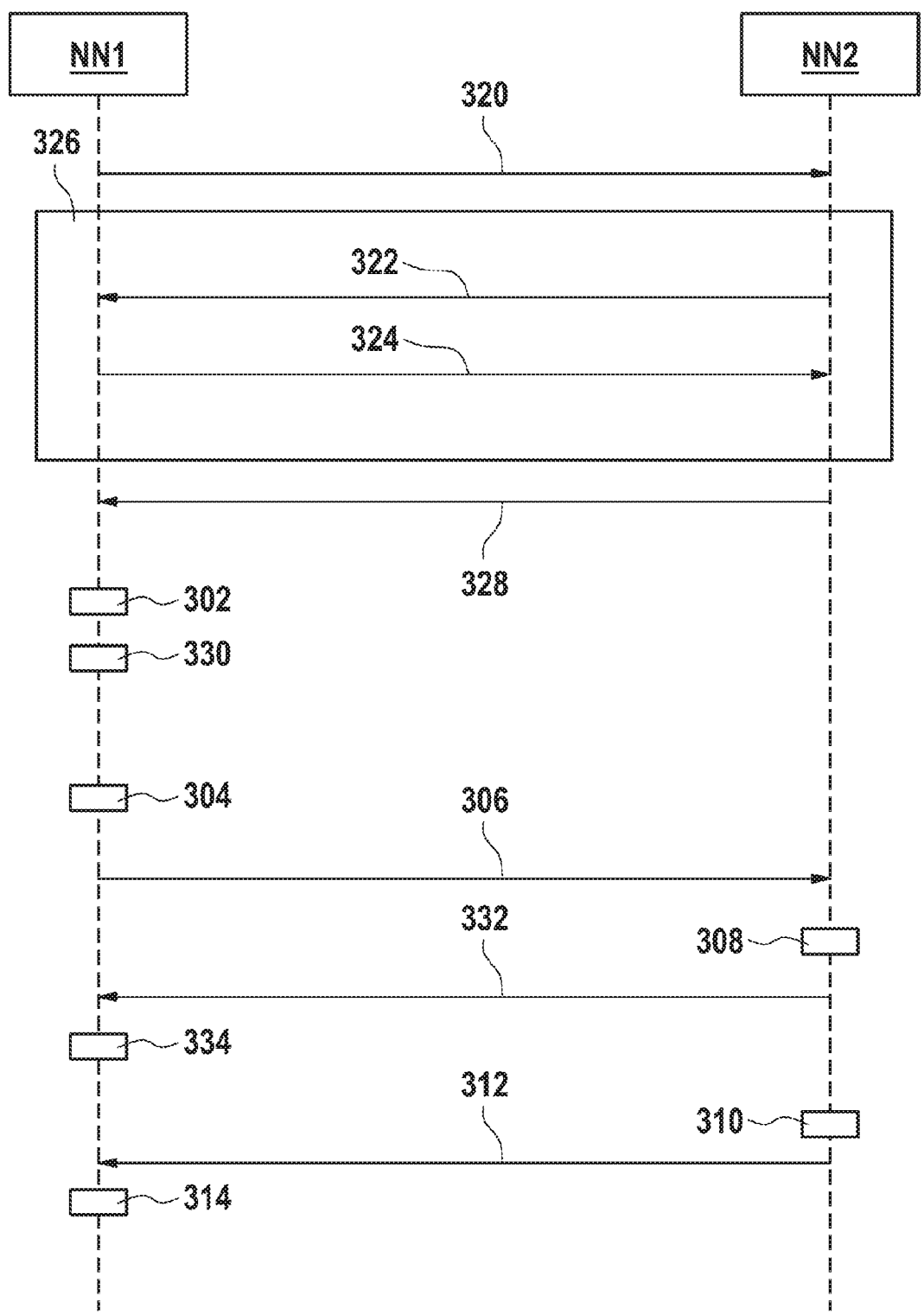

FIG. 3 shows a schematic flowchart for operating the respective terminals NN1, NN2. The terminal NN2, at the beginning of the flowchart that is shown, is not yet part of the group of terminals. The admission of the second terminal NN2 into the group of terminals comprising at least the terminal NN1 is shown.

In a step 320, the first terminal NN1, which has the role of a platoon leader, transmits an availability message as broadcast message at regular intervals, which message is signed for example by way of a private asymmetric individual key, for example in accordance with ECDSA (in accordance with ETSI TS 103 097 or IEEE1609.2; ECDSA: elliptic curve digital signature algorithm). In the case of step 320, broadcast means transmission to all reachable devices.

In this description, a transmission of the message to terminals of the assigned group is however likewise referred to as broadcast message, wherein the encryption with the respective group, pair or individual key stipulates whether a unicast or broadcast transmission is present. Furthermore, a timestamp is in each case added to the messages determined in this description, in order to prevent what are known as replay attacks. The timestamp received with the message is checked on the receiver side. In a further example, the messages exchanged between the group members or terminals of the group comprise a sequence number in order to recognize a message loss and/or the abovementioned replay attacks.

In a step 322, the terminal NN2 transmits a unicast request to the terminal NN1, wherein the request is signed by way of the private asymmetric individual key that is assigned to the terminal NN2. Upon the unicast request transmitted in step 322, the first terminal NN1, in a step 324, transmits a unicast response to the second terminal NN2, wherein the unicast response comprises group details such as for example the selected route, hazardous substance transporters comprising the group or the like, and wherein the unicast response is signed with the private asymmetric individual key of the first terminal and is encrypted with the public asymmetric key of the second terminal. According to a block 326, steps 322, 324 are optional.

In a step 328, the second terminal NN2 communicates to the first terminal NN1 that it would like to be admitted to the group managed by the first terminal NN1, wherein a corresponding message is signed with the private asymmetric individual key of the second terminal NN2 and is encrypted with the public asymmetric key of the first terminal NN1.

The encryption performed in step 328 is performed for example in accordance with ECIES (elliptic curve integrated encryption scheme) and AES-CCM depending on the public asymmetric key of the communication partner—in this case of the first terminal NN1—wherein the public asymmetric key is arranged in a certificate, assigned to the first terminal NN1, in accordance with ETSI 103 097 and/or IEE 1609.2. These steps performed in step 328 are obviously able to be transferred to the other similar steps in the following description.

In a step 302, at least two symmetric group keys for the group of terminals are determined or at least two already generated symmetric group keys are selected.

In a step 330, the symmetric pair key that is assigned to the second terminal NN2 is determined by the first terminal NN1.

In a step 304, the at least two symmetric group keys and the symmetric pair key are signed with the private asymmetric individual key assigned to the first terminal NN1 and encrypted with the public asymmetric key of the second terminal NN2.

The two symmetric group keys signed and encrypted in step 304 and the likewise signed and encrypted symmetric pair key are transmitted to the second terminal NN2 within the meaning of an admission acceptance in a step 306, wherein the admission acceptance is signed with the private asymmetric individual key assigned to the second terminal NN2 and encrypted with the public asymmetric key of the first terminal NN1. By virtue of the use of the symmetric group key to encrypt information intended for the group following steps 304 and 306, even static information that is exchanged within the group and that contains for example information about the signer of the message is not able to be tracked from outside the group, as a result of which the potential for an attack is reduced.

In a step 308, the second terminal NN2 decrypts the message, received in step 306, comprising the at least two symmetric group keys, the symmetric pair key and a signature and checks the origin of the message from the first terminal NN1 depending on the received signature. In a step 332, the second terminal NN2 confirms admission to the group to the first terminal NN1, wherein a corresponding message is encrypted with the valid symmetric group key.

The message transmitted in step 332 comprises for example a signature that is determined depending on transmitted data and the private asymmetric key of the second terminal NN2. In a step 334, the first terminal NN1 checks the origin of the message received in step 332 depending on the received signature and depending on a certificate that is assigned to the second terminal NN2.

In step 334, it is in particular checked whether the second terminal NN2 is using a correct participant identifier. Step 334 is executed independently by each terminal of the group, since the message transmitted in step 332 is able to be received and decrypted by each participant or each terminal of the group by virtue of the encryption with the symmetric group key.

In step 310, data such as for example position, speed, etc., which are intended to be transmitted at regular time intervals, that is to say periodically, to the first terminal NN1, are encrypted with the currently valid symmetric group key. The data encrypted in step 310 are transmitted to the first terminal NN1 in step 312, which terminal decrypts the received encrypted data depending on the symmetric group key in a step 314. In a first example, a signature is attached to these data to be transmitted regularly, which signature is determined depending on the data to be transmitted and depending on a private asymmetric key. In a second example, a signature is not attached to these data to be transmitted regularly, but still to the other protocol-specific messages mentioned here.

Figure 4:
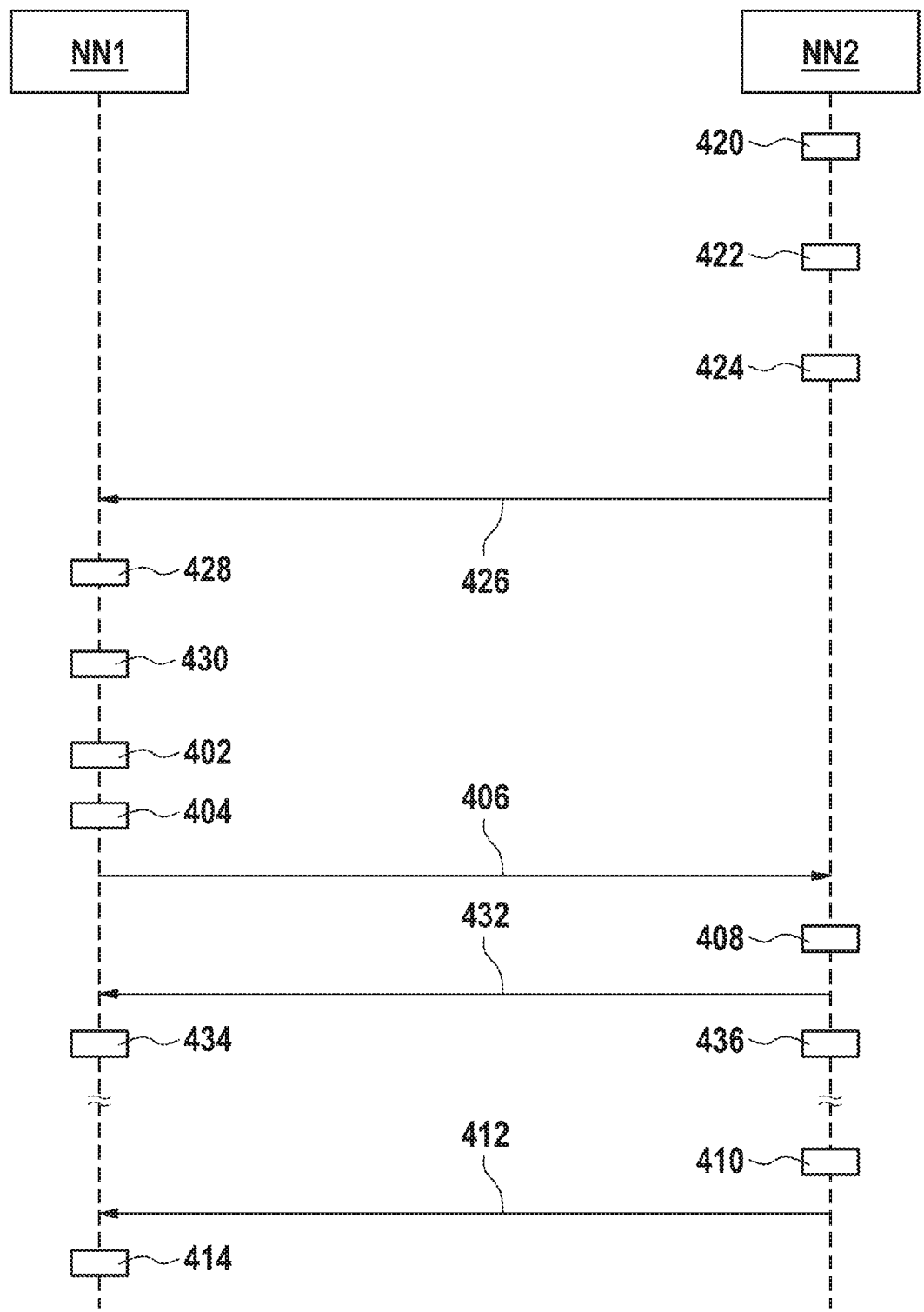

FIG. 4 shows a schematic flowchart for operating the respective terminals NN1, NN2. In a step 420, the second terminal NN2 changes an identifier. This may take place for example in the same way as in the specification ETSI TR 103 415, wherein the change takes place for example from a distance traveled since the last change, an elapsed time since the last change. The terminal NN2 thus independently decides on the change time and does not initially coordinate this with other group members. If the change time is determined once, then the terminal NN2 performs the key change of the group key independently and communicates this, either separately or by using the currently valid group key selected by the terminal NN2 in the case of a transmitted message encrypted with the selected group key, to the other terminals of the group. Of course, the first terminal NN1 or another terminal of the group may also independently initiate a change of the group key.

The second terminal NN2 has at least two symmetric group keys, as a result of which, in a step 422, the next group key that has not yet been used is selected as valid symmetric group key. In step 422, the symmetric key and therefore the identity/identifier of the key is changed. In step 422, all of the previously used symmetric group keys for at least one transmission of messages are blocked or deleted.

In a step 424, a change of the device identifier is prevented for as long as no new group key that would be able to be selected as new valid group key is yet present in the local memory of the second terminal NN2.

In a step 426, the second terminal NN2 transmits a message to be transmitted regularly containing potentially different content, for example comprising speed and/or position of the second terminal NN2, to the terminal NN1 or the group of terminals, wherein the message is encrypted with the valid symmetric group key selected in step 422.

In a step 428, the first terminal NN1 recognizes, depending on the message from step 426—for example using a received key identifier, that the valid symmetric group key has been changed by the terminal NN2. In step 428, the next already present symmetric group key is selected, such that, after step 428, the two terminals NN1 and NN2 use the same symmetric group key.

According to a step 430, a change of the identifier of the terminal is prevented for as long as no new group key that would be able to be selected as new group key is yet present in the local memory of the terminal NN1.

In a step 402, the terminal NN1 determines at least one new symmetric group key that is encrypted, in a step 404, with the symmetric pair key of the second terminal NN2. In a step 406, the new symmetric group key encrypted in step 404 is transmitted to the second terminal NN2. In a step 408, the received encrypted symmetric group key is decrypted and stored depending on the symmetric pair key that is assigned to only the two terminals NN1, NN2, wherein the currently valid symmetric pair key continues to remain valid. The received symmetric group key serves for use in a following change event according to step 420. In a step 432, a positive reception confirmation in relation to the group key transmitted in step 406 is transmitted to the terminal NN1, wherein the positive reception confirmation is encrypted with the symmetric pair key. After step 432 has been performed, both terminals NN1, NN2, according to respective steps 434 and 436, perform a change of the symmetric pair key, wherein the symmetric pair key that is valid thereafter is determined depending on the previously valid pair key, for example by applying a KDF (key derivation function) to the previously valid pair key in order to obtain the same result for the terminals NN1 and NN2. One example of a KDF is the HMAC-SHA256 method that determines the new symmetric pair key with the currently valid symmetric pair key as input parameter. Step 432 thus triggers the execution of steps 434 and 436 and therefore ensures a synchronized change of the symmetric pair key. In one alternative example, the valid symmetric pair key is determined depending on a common random-based output value and a counter that is transmitted in the initial key exchange, wherein the symmetric pair key is used as message and the counter is used as key for the HMAC-SHA256. The next exchange of the symmetric group key is thus secured by the respective independent determination of the pair key and the corresponding encryption of the symmetric group key with the pair key. Steps 406, 408, 432, 434 and 436 are performed for each member or terminal of the group managed by the terminal NN1, wherein the encryption is performed individually for each participant.

Since the terminals NN1 and NN2 have to ensure that a transmitted message reaches the other communication partner, the terminal NN2, following step 432, waits for example for a period of time and continues with step 436 only after the period of time has elapsed. The terminal NN2 thus ensures that the message from step 432 has reached the terminal NN1. The terminal NN2 starts a timer after the sending in step 406 and repeats the transmission of the message from step 406 until the message has been received by the terminal NN1 in step 432.

In a step 410, a message to be transmitted to the first terminal NN1 is encrypted with the valid group key selected in steps 422 and 402 so as to be decrypted after the transmission in step 412 on the side of the terminal NN1 in a step 414.

Figure 5:
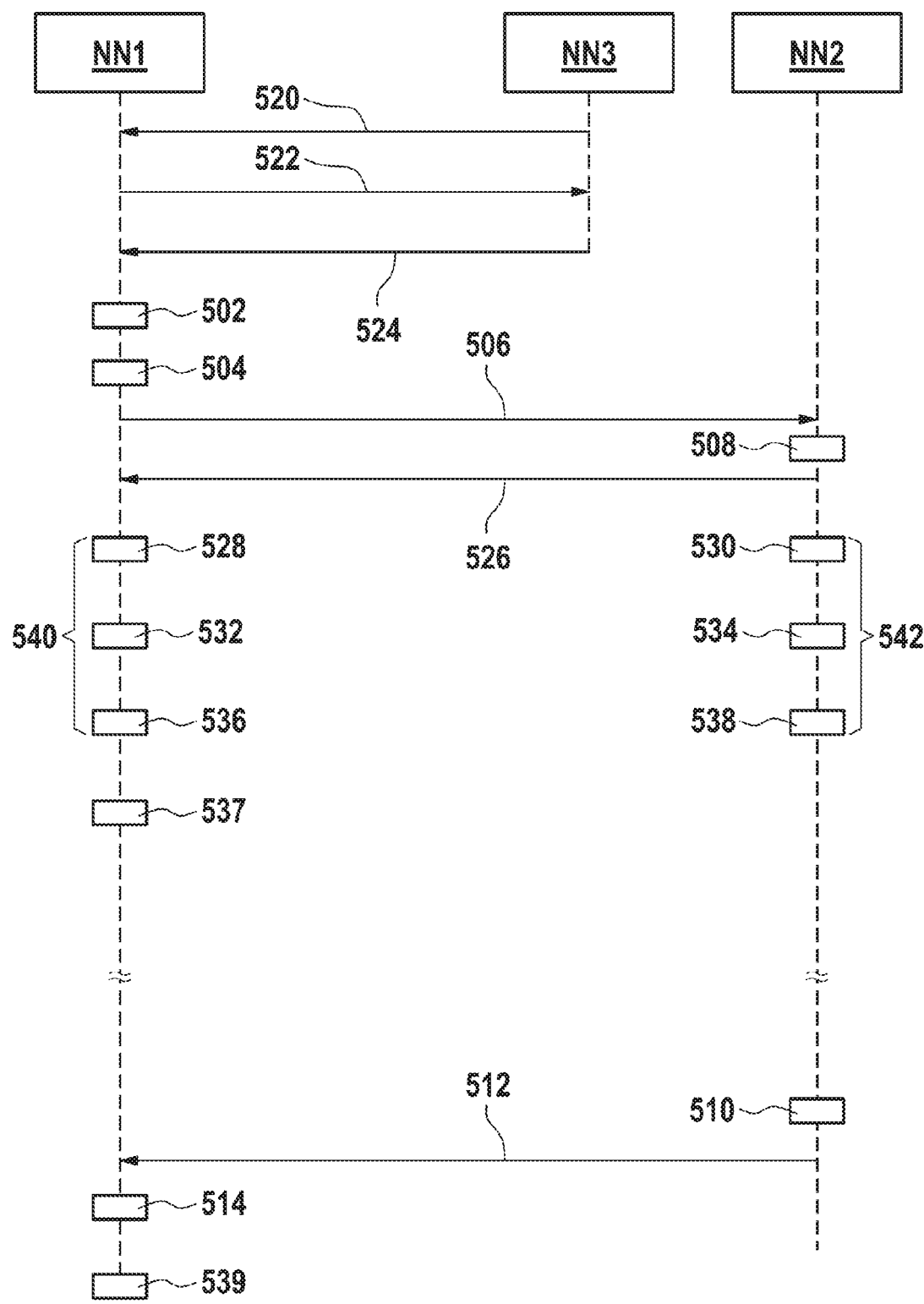

FIG. 5 shows a schematic flowchart for operating the respective terminals NN1, NN2, NN3. It is shown how the terminal NN3 leaves the group of terminals and which mechanisms secure the communication between the remaining terminals NN1, NN2. In a step 520, the terminal NN3 transmits a withdrawal request encrypted with the currently valid symmetric group key to the members of the group, in particular to the terminal NN1. In response to the withdrawal request transmitted in step 520, the terminal NN1 confirms, in a step 522, the withdrawal request for the terminal NN3 by way of a message correspondingly encrypted with the symmetric group key. The terminal NN3 confirms the message received in step 522 in a step 524, and is therefore no longer part of the group of terminals NN1, NN2. Optionally, the messages exchanged in steps 520, 522, 524 are provided with a signature.

In a step 502, a new symmetric group key is determined, which is encrypted, in a step 504, depending on the currently valid symmetric pair key. In a step 506, the encrypted new symmetric group key and an encrypted withdrawal indication that signals the withdrawal of the terminal NN3 from the group of terminals are transmitted to the terminal NN2, which decrypts this encrypted symmetric group key in a step 508. The reception of the new symmetric group key is confirmed by the first terminal NN1 in a step 526. Following step 526, the remaining terminals, in respective steps 528 and 530, independently determine a new symmetric pair key depending on the withdrawal indication, wherein these steps are determined in the group for each pair of communication partners according to terminals NN1, NN2. In respective steps 532 and 534, the new symmetric group key determined in step 502 is selected as currently valid group key, and all of the older group keys for the transmission of messages are blocked or all of the old group keys are deleted. The second terminal NN2 thus determines the new symmetric pair key as soon as it has received the withdrawal indication, and selects this new symmetric pair key as valid pair key. In the event of an incorrect withdrawal declaration of the third terminal NN3, the first terminal NN1 does not distribute a new group key and also does not transmit a withdrawal indication.

In respective steps 536 and 538, a change of the identifier of the respective terminal is blocked for as long as no new group key that would be able to be selected as valid key is yet present in the local memory.

The combined steps 540 and 542 are essentially performed in parallel with one another and are synchronized with one another by the preceding step 526.

In a step 537, the first terminal NN1 recognizes that there is no successor for the valid symmetric group key in the local memory of the terminal NN1. In step 537, the terminal NN1 determines a further symmetric group key and distributes this in accordance with steps 402, 404, 406, 408, 432, 434 and 436 to all of the terminals remaining in the group.

In a step 510, a message is encrypted in accordance with the currently valid symmetric group key that was selected in steps 532 and 534 and sent to the terminal NN1 in a step 512, so as to be decrypted by the terminal NN1 in a step 514.

In a step 539, the terminal NN1 determines a change indication that indicates a change of the group key. The first terminal NN1 continues, starting from step 539, with the step 428 explained in FIG. 4, so as to change the group key.

FIG. 6 shows a schematic block diagram for determining and processing a message M in the case of transmission and reception by way of the symmetric group key or by way of the symmetric pair key. A block 602 of a transmitting terminal TRANS encrypts determined data D by way of the currently valid symmetric group key dk(i) or by way of the currently valid symmetric pair key into encrypted data D_encr. The block 602 uses an authenticated encryption method, for example AES-CCM (advanced encryption standard counter mode), to determine the encrypted data D_encr.

A block 604 determines a key identifier dkid(i) depending on the currently valid symmetric group key dk(i) or the currently valid symmetric pair key. By way of example, the lower 8 bytes of a SHA-256 hash of the currently valid symmetric group key dk(i) or of the currently valid symmetric pair key are determined and used as key identifier dkid(i).

An identifier ID TRANS for identifying the transmitting terminal TRANS and an identifier ID REC for identifying the receiving terminal REC are inserted into the message M by the transmitting terminal TRANS. The control information control comprise for example information that characterizes the message M as a unicast message or broadcast message.

Following reception of the message M by the receiving terminal REC, a block 606 determines, from a number of key identifiers dkid known to the terminal REC, the symmetric group key dk(i) matching the received key identifier dkid(i) or the symmetric pair key matching the received key identifier dkid(i). A block 608 determines the unencrypted data D depending on the received encrypted data D_encr and the matching symmetric group key dk(i) or the matching symmetric pair key.

The invention claimed is:

1. A first vehicle-side terminal of a group of terminals of a radio communication network, wherein the first vehicle-side terminal comprises
at least one processor,
at least one memory containing computer program code,
at least one communication module and
at least one antenna,
wherein the computer program code is configured such that it acts with the at least one processor, the at least one communication module and the at least one antenna such that the first vehicle-side terminal
determines at least one symmetric group key that is assigned to the group of terminals (202; 302; 402; 502),
encrypts the at least one symmetric group key with a public asymmetric individual key that is assigned to a second vehicle-side terminal or with a symmetric pair key that is assigned only to the first and to the second vehicle-side terminal (204; 304; 404; 504),
transmits the encrypted symmetric group key in the direction of the second vehicle-side terminal (206; 306; 406; 506),
receives an encrypted message from the second vehicle-side terminal (NN2) (212; 312; 412; 512),
decrypts the encrypted message depending on the determined symmetric group key (214; 314; 414; 514),
receives a positive reception confirmation that confirms a reception of a new symmetric group key by the second vehicle-side terminal,
determines a new symmetric pair key that is assigned only to the first and to the second vehicle-side terminal based on receiving the positive reception confirmation, and
selects the new symmetric pair key as a new currently valid symmetric pair key.

2. The first vehicle-side terminal according to claim 1, wherein the first vehicle-side terminal
receives an encrypted admission request from a second vehicle-side terminal,
decrypts the admission request depending on a private asymmetric key that is assigned to the first vehicle-side terminal,
determines at least two symmetric group keys that are assigned to the group of terminals,
determines the symmetric pair key,
encrypts the at least two symmetric group keys and the determined symmetric pair key with the public asymmetric individual key that is assigned to the second terminal, and
transmits the at least two encrypted symmetric group keys and the determined encrypted symmetric pair key in the direction of the second vehicle-side terminal.

3. The first vehicle-side terminal according to claim 1, wherein the first vehicle-side terminal
determines a change of the symmetric group key,
selects an already determined symmetric group key as valid symmetric group key,
determines a new symmetric group key,
encrypts the new symmetric group key depending on the symmetric pair key that is assigned to the second vehicle-side terminal, and
transmits the encrypted new symmetric group key in the direction of the second vehicle-side terminal.

4. The first vehicle-side terminal according to claim 1, wherein the first vehicle-side terminal
receives a withdrawal request from a third terminal,
determines a further new symmetric group key,
encrypts the further new symmetric group key and a withdrawal indication depending on the symmetric pair key that is assigned to the first and to the second terminal,
transmits the encrypted further new symmetric group key and the withdrawal indication in the direction of the second vehicle-side terminal,
selects the further new symmetric group key as currently valid group key,
determines a further new symmetric pair key that is assigned to the second vehicle-side terminal, and
selects the further new symmetric pair key as valid symmetric pair key.

5. The first vehicle-side terminal according to claim 1, wherein the first vehicle-side terminal
receives the encrypted message and an encrypted signature from the second vehicle-side terminal,
decrypts the encrypted message and the encrypted signature depending on the symmetric group key, and
verifies the origin of the message from the second vehicle-side terminal depending on the signature and depending on a public certificate that is assigned to the second vehicle-side terminal.

6. A method for operating a first vehicle-side terminal of a group of terminals of a radio communication network,
wherein the first vehicle-side terminal determines at least one symmetric group key that is assigned to the group of terminals (202; 302; 402; 502),
encrypts the at least one symmetric group key with a public asymmetric individual key that is assigned to a second vehicle-side terminal or with a symmetric pair key that is assigned only to the first and to the second vehicle-side terminal (204; 304; 404; 504),
transmits the encrypted symmetric group key in the direction of the second vehicle-side terminal (206; 306; 406; 506),
receives an encrypted message from the second vehicle-side terminal (212; 312; 412; 512),
decrypts the encrypted message depending on the determined symmetric group key (214; 314; 414; 514),
receives a positive reception confirmation that confirms a reception of a new symmetric group key by the second vehicle-side terminal, determines a new symmetric pair key that is assigned only to the first and to the second vehicle-side terminal based on receiving the positive reception confirmation, and selects the new symmetric pair key as a new currently valid symmetric pair key.

7. A second vehicle-side terminal of a group of terminals of a radio communication network, wherein the second vehicle-side terminal comprises at least one processor,
at least one memory containing computer program code,
at least one communication module and
at least one antenna,
wherein the computer program code is configured such that it acts with the at least one processor, the at least one communication module and the at least one antenna such that the second vehicle-side terminal receives at least one encrypted symmetric group key that is assigned to the group of terminals from a first vehicle-side terminal (206; 306; 406; 506), decrypts the at least one encrypted symmetric group key with a private asymmetric individual key that is assigned to the second vehicle-side terminal or with a symmetric pair key that is assigned only to the first and to the second vehicle-side terminal (208; 308; 408; 508), encrypts a message depending on the received decrypted symmetric group key (210; 310; 410; 510), transmits the encrypted message in the direction of the first vehicle-side terminal (212; 312; 412; 512), receives a new encrypted symmetric group key, decrypts the new encrypted symmetric group key depending on a currently valid symmetric pair key, resulting in a new symmetric group key, transmits a positive reception confirmation that confirms a reception of the new symmetric group key by the second vehicle-side terminal, determines a new symmetric pair key that is assigned only to the first and to the second vehicle-side terminal based on the transmitted positive reception confirmation, and selects the new symmetric pair key as a new currently valid symmetric pair key.

8. The second vehicle-side terminal according to claim 7, wherein the second vehicle-side terminal encrypts an admission request depending on a public asymmetric key that is assigned to the first vehicle-side terminal, transmits the encrypted admission request in the direction of the first vehicle-side terminal, receives at least two encrypted symmetric group keys and an encrypted symmetric pair key, and decrypts the at least two encrypted symmetric group keys and the encrypted symmetric pair key depending on a private asymmetric individual key that is assigned to the second terminal.

9. The second vehicle-side terminal according to claim 8, wherein the second vehicle-side terminal determines a change of the symmetric group key,
selects an already received symmetric group key as valid symmetric group key, receives a new encrypted symmetric group key from the first vehicle-side terminal, and decrypts the new encrypted symmetric group key depending on the symmetric pair key that is assigned to the second vehicle-side terminal.

10. The second vehicle-side terminal according to claim 8, wherein the second vehicle-side terminal receives an encrypted further new symmetric group key and an encrypted withdrawal indication, decrypts the further new symmetric group key and the withdrawal indication depending on the symmetric pair key that is assigned to the second terminal, selects the further new symmetric group key as currently valid group key depending on the withdrawal indication, determines a further new symmetric pair key that is assigned to the second vehicle-side terminal, and selects the further new symmetric pair key as valid symmetric pair key depending on the withdrawal indication.

11. The second vehicle-side terminal according to claim 8, wherein the second vehicle-side terminal determines a signature depending on the message and depending on the private asymmetric key that is assigned to the second vehicle-side terminal, encrypts the message and the signature depending on the valid symmetric group key, and transmits the encrypted message and the encrypted signature in the direction of the first vehicle-side terminal.

12. A method for operating a second vehicle-side terminal, wherein the second vehicle-side terminal receives at least one encrypted symmetric group key that is assigned to the group of terminals from a first vehicle-side terminal (206; 306; 406; 506), decrypts the at least one encrypted symmetric group key with a private asymmetric individual key that is assigned to the second vehicle-side terminal or with a symmetric pair key that is assigned only to the first and to the second vehicle-side terminal (208; 308; 408; 508), encrypts a message depending on the received decrypted symmetric group key (210; 310; 410; 510), transmits the encrypted message in the direction of the first vehicle-side terminal (212; 312; 412; 512), receives a new encrypted symmetric group key, decrypts the new encrypted symmetric group key depending on a currently valid symmetric pair key, resulting in a new symmetric group key, transmits a positive reception confirmation that confirms a reception of the new symmetric group key by the second vehicle-side terminal, determines a new symmetric pair key that is assigned only to the first and to the second vehicle-side terminal based on the transmitted positive reception confirmation, and selects the new symmetric pair key that is assigned only to the first vehicle-side terminal and the second-side terminal as a new currently valid symmetric pair key.

* * * * *